Patented Aug. 25, 1942

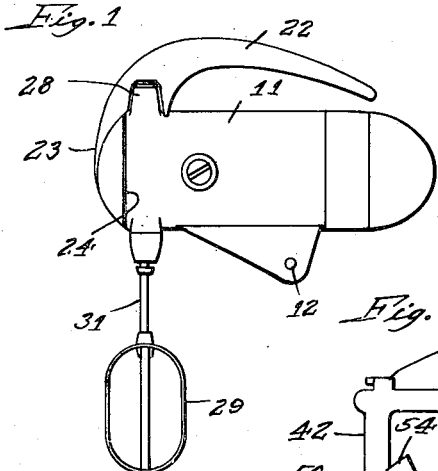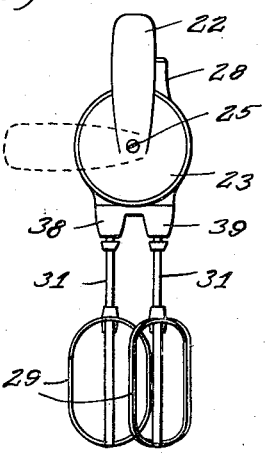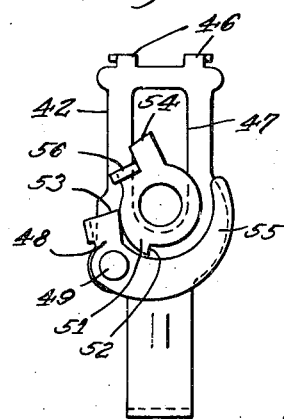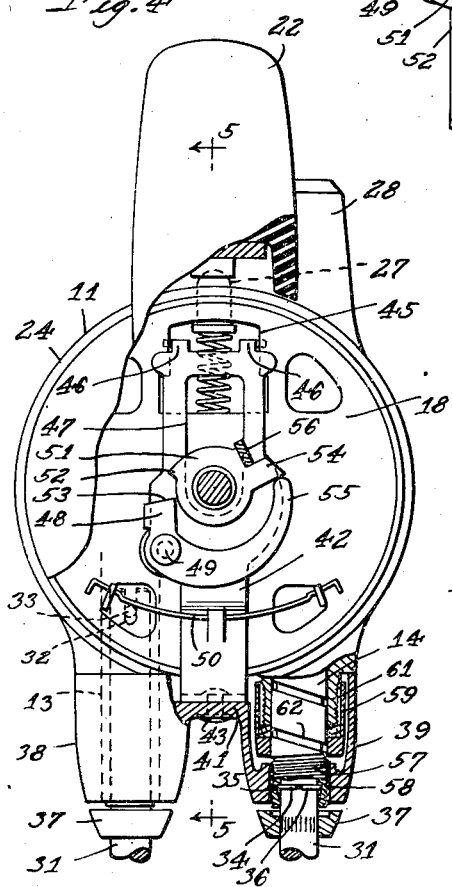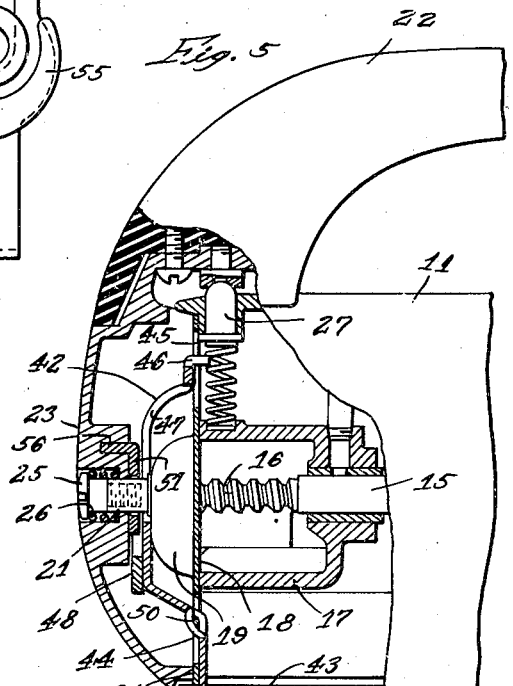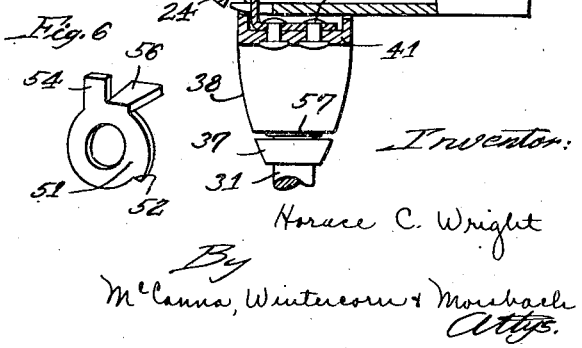

2,293,959

UNITED STATES PATENT OFFICE 2,293,959

BEATER EJECTOR FOR MIXERS

Horace C. Wright, Chicago, Ill., assignor to Chicago Flexible Shaft Company, Chicago, Ill., a corporation of Illinois Application February 1, 1941, Serial No. 376,953

12 Claims. (Cl. 259—1)

This invention relates to household mixers and the like and has more particular reference to means for detaching or ejecting the beater or mixer elements from the working position.

Heretofore in mixers of the household type provision has been made for detachably retaining the beaters in working position on a motor unit preferably by means including spring retainers or the like which are displaceable by exerting lengthwise pull on the beaters sufficient to overcome the tension of the retaining means for ejection or withdrawal of the beaters for the purpose of cleaning, replacement, or to permit the use of other attachments. Provision has also been made to exert this lengthwise pull on the beaters by mechanical means manually operable so as to reduce the amount of manual effort required to eject the beaters and to avoid the necessity of soiling the hands by grasping the beaters which are sometimes covered with batter or other materials.

The prior ejecting means have not, however, been entirely satisfactory and I have, therefore, in the present invention aimed to provide improved means with a view to facilitating removal of the beaters.

A further object is to utilize the handle of a mixer unit of this kind as the operating means for effecting detachment or ejection of the beaters or mixing device, and to provide means whereby the operation may be more conveniently and effectively performed and with less physical effort on the part of the user.

A further object is to provide an improved beater ejector mechanism for application to a household mixer of the type having a portable mixer unit.

Another object is to provide improved beater ejector means which serves also as a means of preventing dough, batter, and other mixtures from entering the casing structure and working into the beater bearings.

Other objects and attendant advantages will be appreciated by those skilled in this art as the invention becomes better understood by reference to the following description when considered in connection with the accompanying drawing, in which Figure 1 is a side elevation of a mixer unit embodying my invention;

Fig. 2 is a front elevation thereof;

Fig. 3 is a front view of certain of the beater ejector parts on a full size scale;

Fig. 4 is a fragmentary front view of the mixer unit, partly in section;

Fig. 5 is a fragmentary side view, partly in section, substantially on the section line 5—5 of Fig. 4; and Fig. 6 is a perspective view of the ejector-slide trigger.

My invention is here shown as applied to a well known make of household food mixer but it should be understood that the invention in its broader aspect may be applied to mixers of other constructions. In the instant case the mixer unit shown in the drawing is of a type adapted to be normally supported on a base structure with the beaters in operative relation with a mixing bowl and further adapted to be removed from the base support so as to permit use of the mixer unit in places remote from said support. The mixer unit here shown comprises a motor casing designated generally by 11 adapted to be detachably mounted at 12 on a base structure (not shown), as is well known in this art, and having a pair of vertical beater spindles 13 and 14 suitably journalled in spaced relation usually at the forward end of the unit. These spindles are driven by suitable power means such as an electric motor in the casing 11. In the example shown the motor shaft 15 has a spiral gear 16 on its forward end which meshes with worm gears (not shown) on the spindles 13 and 14 for driving the same. This gearing is confined within a casing 17 which serves to retain lubricant for the gears and also for the spindle bearings. In the present design the front end of this lubricant casing is closed by a plate 18 suitably secured in position, which casing has a central forward extension 19 carrying a forwardly projecting boss 21. Through means of this boss 21, which is coaxial with the motor shaft 15, a handle 22 is attached to the mixer unit with capacity to be swung back and forth about this center axis between the upright normal position shown in Figs. 1, 2, 4 and 5, and a lateral position such as shown in dotted lines in Fig. 2. The handle 22 is fixed to a front plate 23 which has annular bearing support at 24 on the unit proper and is retained in working position by the screw 25 threaded into the boss 21, a coil spring 26 being preferably interposed between the head of the screw and the plate 23 to yieldingly seat the latter at its peripheral edge. A spring-pressed detent 27 carried on the mixer casing serves to yieldingly retain the handle in the upright position and permits lateral displacement to the lower position, as will be obvious. The handle is displaceable to the lower position for the purpose of accommodating a juice extractor bowl (not shown) on top of the mixer unit, as claimed in my Patent No. 2,070,768, granted February 16, 1937. As is more fully disclosed in my said patent, the mixer bowl is adapted to be supported on an upstanding boss 28 on top of the casing 11 preferably coaxial with the spindle 14 when this spindle is used to drive the juice extractor shaft. It will be manifest from the foregoing that when the handle is in the normal upright position above mentioned it is adapted for carrying the mixer unit. It is also adapted for manipulating the unit either by tilting it on its pivotal mounting at 12, for removing and replacing the unit with respect to the base structure, and for handling and manipulating the unit in operations remote or independent from its base.

The beaters 29 may be of any suitable or preferred construction and may be releasably mounted as a unit or individually in connection with the mixer unit above described which provides a power drive for the beaters. In the present case the beaters are individually mounted, each beater being carried by a shaft 31 which is adapted to slide telescopically within one of the beater spindles and to have driving connection therein as by means of a slotted end 32 engaging a diametrical pin 33 in the spindle, or any equivalent means for this purpose. The beater shafts are retained in working position by suitable means preferably including one or more spring retainers. Where the beaters are individually removable, as distinguished from the unitary assembly of the beaters, as is sometimes used, an individual spring retainer is provided between each beater shaft and its spindle. This may be in the form of a split ring of spring wire such as 34 confined in a groove 36 in the beater shaft, the ring being adapted to snap into a complemental groove 35 in the spindle when the beater shaft is inserted to its working position. A collar or other fixed abutment 37 on each beater shaft is adapted to be engaged by an ejector device of the present invention for ejecting the beaters, in this case simultaneously.

According to my invention the handle 22 is utilized as the force-applying means for ejecting the beaters or effecting the disconnection of the beating device from the driving device or from the means for supporting the beating device. The operation in the preferred embodiment is to eject the beaters by movement of the handle from the upright position to a lateral position. The ejector proper comprises cup-shaped members 38 and 39 embracing the projecting ends of the beater spindles 13 and 14, respectively, joined together as a unit by means of the cross-piece 41, the lower ends of the ejector members being in position to engage the abutments 37 for exerting downward pull on the beater shafts to overcome the tension of the spring retainers 34 and thus release or detach the beater shafts from the spindles and permit them to fall by gravity or be freely withdrawn. In the preferred embodiment the ejector member is moved vertically by means of an ejector slide designated generally by 42, which slide is fixed as at 43 to the part 41 and extends upwardly into the motor casing and forwardly through an opening 44 in the plate 18 and thence upwardly between the plate portion 19 and the front plate 23 and having its upper end 45 guided on the sides of a slot 46 in the plate 18. The ejector slide is slotted lengthwise at 47 for clearance of the boss 21. Suitable means such as a spring 50 is employed for constantly urging the ejector slide to the uppermost position, that is, the normal beater-retaining position shown in Figs. 4 and 5. In the present embodiment this spring is supported at its ends on the plate 18 and engages the slide centrally between its ends as shown in Fig. 4. A pawl designated generally by 48 pivoted at 49 to the ejector slide is adapted to be actuated by a trigger designated generally by 51 fixed to the inner side of the front plate 23. The pawl 48 and trigger 51 are disposed in coplanar relation, as shown in Fig. 5, and are so shaped and arranged that the arm 52 of the trigger will engage the upstanding arm 53 of the pawl when the handle 22 is swung in a counterclockwise direction, viewing Fig. 4, and move the slide and consequently the ejector members 38—39 downwardly in a beater ejecting operation. During this beater ejecting movement of the handle 22 the trigger arm 52 will be moved past the pawl arm 48 substantially as shown in Fig. 3 and the spring 50 will function to urge the ejector slide upwardly to the extent permitted by the position of the handle and its trigger. When the handle is returned to the upright position a projecting arm 54 on the trigger will in its clockwise movement, viewing Fig. 4, engage an arm 55 on the pawl and positively return the pawl to the normal position shown in Fig. 4 if the pawl has not been previously returned to this position by gravity by reason of the greater weight of the arm 55. During return of the handle from the lower to the upper position the trigger arm 52 will engage and displace the pawl arm 53, as will be obvious. The trigger 51 is, in this instance, fixedly secured to the front plate 23 by means of a lug 56 which is an insert in the part 23, inserted at the time of die casting the same.

Another feature of my invention is the provision of means whereby the ejector members 38—39 serve to prevent dough and batter mixtures and the like from being carried upwardly along the beater spindles and entering the spindle bearings. This purpose is served in part by the exterior shape of the members 38—39. Also, the lower end portion of each spindle is provided on its periphery with a screw thread of substantial depth as at 57. Each ejector member is shaped to provide a confining wall portion 58 substantially coextensive in length with the threaded portion 57 allowing just sufficient clearance for rotation of the spindle. The screw thread has a lead which feeds downwardly when the spindle rotates, thereby tending to forcibly keep away dough or batter from entering the casing. This is a troublesome problem in the case of dough which sometimes works up the beater shaft. Since the beater spindles are driven in opposite directions the threads 57 on the respective spindles will have leads in opposite directions. As a further means of keeping dough from entering at this point the lower extremity of each spindle is projected slightly beyond the lower end of the cup-shaped ejector members 38—39, as shown in Figs. 4 and 5. Each ejector member is further shaped interiorly for clearance of the cup member 59 which is fixed to the spindle and coacts with an exteriorly threaded boss 61 on the casing proper, the members 59 and 61 serving an oil retaining purpose as claimed in the patent to Jeppsson 2,113,025, granted April 5, 1938. As described in said patent the spiral groove 62 on the spindle serves to return oil to the reservoir in the casing 17.

It will be manifest from the foregoing that my invention provides a simple and practical means for ejecting the beaters automatically by the act of swinging the handle laterally and that by reason of the relatively long lever arm and the cam effect of the trigger against the pawl only small physical effort is required and this in a convenient manner. Furthermore, the beaters are positively ejected, thus making the operation quick and certain. These features are particularly desirable because mixers of this type are most generally used by women. Another advantage is that the ejector mechanism is incorporated in the structure in such novel manner as to require but a minimum change and without disturbing the ornamental design. A further advantage is that there are no small projecting parts to be operated by the user. The ejector mechanism is concealed except for the cup-shaped members which directly engage the beaters, and these members are susceptible of such design as to improve the general appearance. These cup-shaped members also serve the additional function of preventing dough and batter from entering the casing. The ejector parts are mainly stampings, which promote economy in cost of manufacture.

While I have shown a particular embodiment of my invention, it will be understood that I do not wish to be limited thereto since many modifications may be made, and I therefore contemplate by the appended claims to cover any such modifications as fall within the true spirit and scope of my invention.

I claim:

1. In combination, a mixer unit having a mixing device detachably held in working position, a handle pivoted on the mixer unit adapted for carrying and manipulating the mixing unit and being movable on its pivot to and from a normal operative position, an ejector element operable to detach the mixing device from the mixer unit, means normally urging the ejector element to a non-ejecting position, and means operated by pivotal movement of the handle away from its said normal position to operate said ejector to effect said detachment of the mixing device.

2. In combination, a mixer unit having a mixing device detachably held in working position, a handle pivoted on the mixer unit adapted for carrying and manipulating the mixing unit and being movable on its pivot to and from a normal operative position, an ejector element operable to detach the mixing device from the mixer unit, means normally urging the ejector element to a non-ejecting position, a pawl carried on the ejector element, and a trigger fixed to the handle coacting with the pawl and operable by movement of the handle to actuate the pawl and thereby the ejector to effect said detachment of the mixing device.

3. In combination, a mixer casing having drive mechanism, a pair of vertical spindles journalled in laterally spaced relation in the casing adapted to be driven by said mechanism, each spindle projecting below the casing, a beater shaft for each spindle having detachable connection therewith, an abutment fixed on each beater shaft spaced below the lower end of each spindle, a cup-shaped member embracing the projecting end of each spindle and disposed in coacting relation with its abutment, a cross-piece connecting the cup-shaped members in fixed relative relation, and manually operable means acting against said cross-piece for imparting movement to said cup-shaped members to cause them to engage said abutments and detach the beater shafts from the spindles in a beater ejecting operation.

4. In the combination set forth in claim 3, in which the lower end portion of each spindle is peripherally threaded for a substantial length and each cup-shaped member closely embraces the said threaded portion of its spindle and serves in coaction therewith to prevent dough and batter mixtures from working upwardly along the spindle.

5. In a household mixer, a casing having beater drive mechanism, a pair of vertical beater spindles driven by said mechanism each projecting beneath the casing, a beater shaft for each spindle, means releasably retaining the beater shafts in coacting relation with the beater spindles, an ejector slide mounted in the casing and having means coacting with the beater shafts adapted for releasing the same from said coacting relation with the beater spindles, and a manually operable lever mounted on the casing and having means coacting with the said ejector slide to operate the latter in a beater ejecting movement.

6. A household mixer as set forth in claim 5, in which the means on the ejector slide comprises a cup-shaped member embracing the projecting end of each beater spindle and serving to act against its beater shaft to effect ejection thereof.

7. In combination, a casing having beater drive mechanism, a beater spindle journalled in the casing and driven by said mechanism, a beater shaft having separable drive connection with the beater spindle, means releasably retaining the beater shaft in said drive relation with the beater spindle, an ejector slide within the casing having means adapted to effect release of said retaining means upon movement of the slide in one direction, and a manually operable lever mounted on the casing and having means adapted for coaction with the slide for imparting said retainer release movement thereto by operation of the lever.

8. The combination set forth in claim 7, in which the means on the lever comprises a trigger arm and in which the slide carries a pivoted pawl adapted to be actuated by the trigger arm when the lever is moved in one direction to thereby move the slide to release said retaining means, and in which the trigger and pawl are returned to coacting relation for a successive operation when the lever is moved in the opposite direction.

9. In combination, a casing having beater drive mechanism, a vertical beater spindle journalled in the casing and having its lower end projecting beneath the casing, a beater shaft having separable driving connection with the spindle, means at the underside of the casing coacting with the spindle to retain oil from leakage along the spindle, the beater shaft having a peripheral threaded portion beneath said oil retaining means leading in a direction to feed downwardly when the spindle is rotated, and manually operable means for effecting separation of the driving relation between the spindle and the beater shaft including a cup-shaped member arranged to embrace said oil-retaining means and to also embrace said threaded portion in coaction therewith to prevent dough and batter mixtures from working upwardly along the beater shaft.

10. In combination, a casing having beater drive mechanism, a beater spindle journalled in the casing and driven by said mechanism, a beater shaft having separable drive connection with the beater spindle, means releasably retaining the beater shaft in said drive relation with the beater spindle, the beater spindle projecting beneath the casing and having its lowermost portion peripherally threaded in a direction to feed downwardly when the spindle is rotated, an annular abutment on the beater shaft beneath the spindle having an outside diameter larger than said peripheral threaded portion whereby to project outwardly substantially beyond said threaded portion, a sleeve member closely embracing and coacting with said peripheral threaded portion to prevent dough and batter from working up the spindle and being in axial alignment with the projecting portion of said abutment, and means for moving said sleeve member axially of the spindle while in coaction with said threaded portion to engage said abutment and thereby release the beater shaft from its drive relation with the spindle.

11. In a household food mixer, a portable motor unit having a casing and vertical beater drive spindles journalled in the casing and projecting beyond the bottom thereof, a handle pivotally mounted on the casing adapted for carrying and manipulating the motor unit and for movement on its pivotal mounting to and from a normal working position, a beater shaft for each spindle, releasable retaining means for holding each beater shaft in operative relation with its spindle, an abutment fixed on each beater shaft spaced below the lower end of the projecting spindle, an ejector slide mounted in the casing for vertical movement with respect thereto and having means adapted for coacting with said abutments for releasing the beater shafts from the beater spindles when moved vertically, means operated by pivotal movement of the handle to move the ejector slide vertically in a beater ejecting movement, and means operated by the slide for engaging said abutments to release said retaining means by said movement of the ejector slide.

12. A mixer unit of the character described comprising a casing having a motor and a beater spindle driven thereby, a beater shaft detachably connected to the beater spindle, a handle extending lengthwise of the motor casing and pivotally mounted on the mixer unit to swing about an axis substantially coaxial with the motor axis to and from a position in which the handle serves for carrying the mixer unit when using it in a manually controlled mixing operation, and means operative between the handle and the beater shaft to detach the beater shaft from the spindle by the operation of moving the handle on its pivot from the mixer carrying position to a position at one side of the mixer unit.

HORACE C. WRIGHT.